United States Patent [19]

Eberle, Jr.

[11] Patent Number: 4,993,567
[45] Date of Patent: Feb. 19, 1991

[54] INVOLUTE EMBOSSMENT BASE STRUCTURE FOR HOT FILL PET CONTAINER

[75] Inventor: Theodore F. Eberle, Jr., Saline, Mich.

[73] Assignee: Hoover Universal, Inc., Plymouth, Mich.

[21] Appl. No.: 492,073

[22] Filed: Mar. 12, 1990

[51] Int. Cl.⁵ .................. B65D 1/02; B65D 1/42; B65D 23/00
[52] U.S. Cl. ............................ 215/1 C; 220/606; 220/608
[58] Field of Search ............ 215/1 C; 220/66, 69, 220/70, 72, 604–606, 608, 609

[56] References Cited

U.S. PATENT DOCUMENTS

| | | | |
|---|---|---|---|
| 4,134,510 | 1/1979 | Chang | 215/1 C |
| 4,174,782 | 11/1979 | Obsomer | 215/70 X |
| 4,249,666 | 2/1981 | Hubert et al. | 215/1 C |
| 4,598,831 | 7/1986 | Nakamura et al. | 220/70 X |
| 4,818,575 | 4/1989 | Hirata et al. | 215/1 C X |
| 4,863,046 | 9/1989 | Collette et al. | 215/1 C |
| 4,877,141 | 10/1989 | Hayashi et al. | 220/72 X |

FOREIGN PATENT DOCUMENTS

| | | | |
|---|---|---|---|
| 1144012 | 9/1986 | Japan | 220/70 |
| 62-28335 | 2/1987 | Japan | 220/70 |
| 2146137 | 6/1987 | Japan | 215/1 C |

Primary Examiner—Sue A. Weaver
Attorney, Agent, or Firm—Harness, Dickey & Pierce

[57] ABSTRACT

An improved base configuration for a blow molded plastic container used in hot-fill applications. The base consists of a peripheral support ring that is generally concentric with the container side walls and connected to a central dome portion. The dome extends upwardly into the body cavity of the container and terminates in a central disk region that is also concentric with the container side walls. A number of raised involute embossments radiate about the central disk in a substantially spiral fashion downward along the dome. The embossments are limited to that area of the dome where unrelaxed retractive stresses may be formed during blow molding of the container. The embossments increase the amount of material in the base which becomes sufficiently oriented so as to resist the deformation induced by the unrelaxed retractive stresses during hot filling of the container.

4 Claims, 2 Drawing Sheets

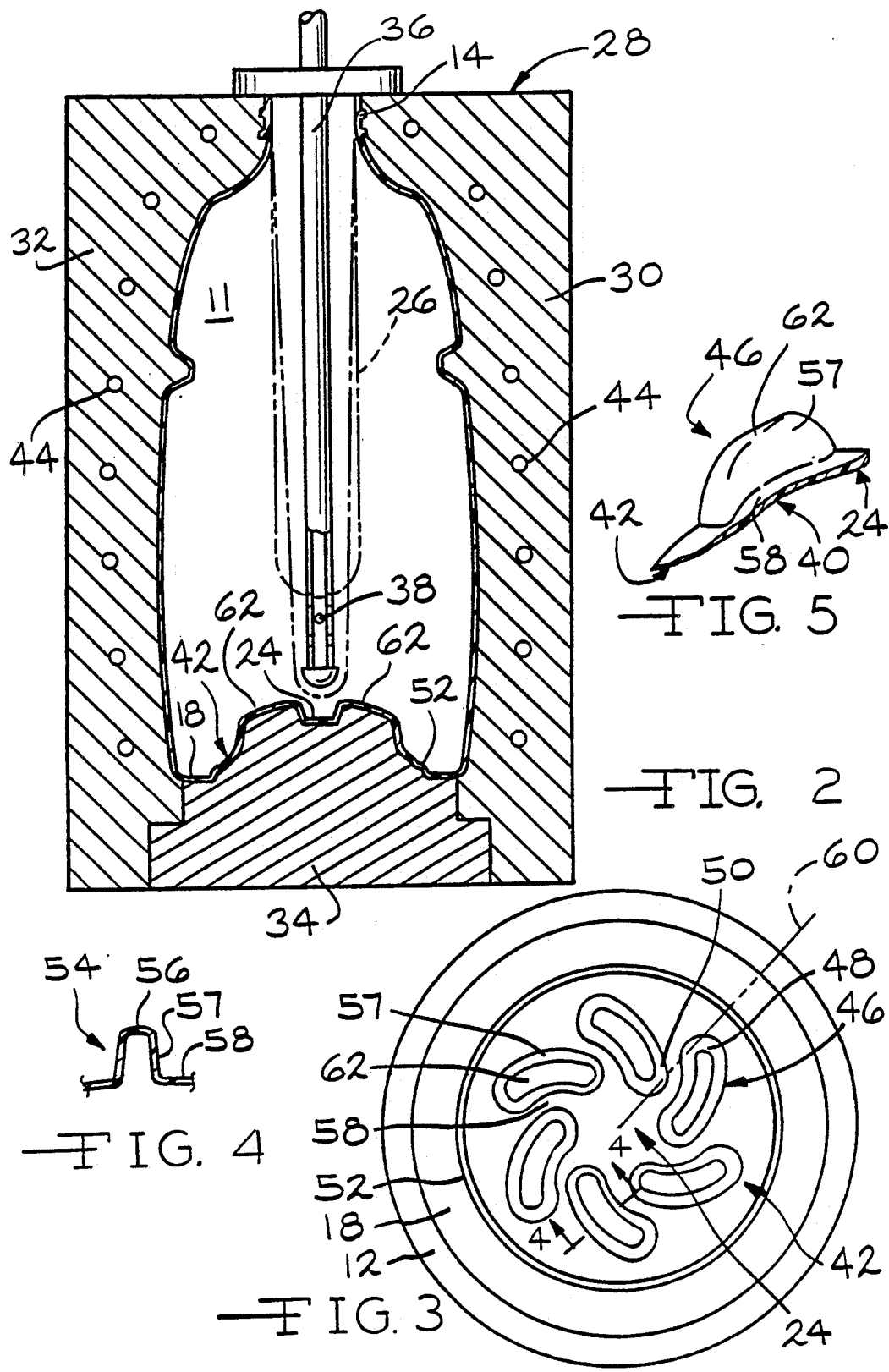

INVOLUTE EMBOSSMENT BASE STRUCTURE FOR HOT FILL PET CONTAINER

BACKGROUND AND SUMMARY OF THE INVENTION

The invention relates generally to polyester containers. In particular, the polyester container is formed of polyethelene terephthalate (PET) and provided with a base configuration which enables the container to resist deformation while being filled with a hot liquid. Furthermore, the base configuration also enables the container to resist deformation during internal pressure changes.

Typically, PET containers are formed by a process in which an injection molded tubular preform is heated and expanded to produce a semi-rigid, thin-walled container. During production and use, the container will be exposed to various pressures and forces. With this in mind, the container must be designed to withstand these physical influences while maintaining an aesthetically and commercially acceptable product.

During the process of molding a PET container, the preform is stretched and inflated (blown) so as to impart both axial and radial elongation into the material. In the art, such formation is known as biaxial elongation. However, biaxial elongation can also impart retractive stresses within the container. If not relaxed or physically restrained, the stresses may subsequently cause the container to shrink and deform into an aesthetically and commercially unacceptable product.

The influence of unrelaxed retractive stresses is of particular significance during various production phases of the container. Immediately after being demolded, the elevated temperature of the PET results in an article that is considerably less rigid than the final product. Predictably, the retractive stresses have a greater influence during this phase of production and the "memory" of the PET causes the container to partially return to its preform shape.

Another phase of production where retractive stresses are of significance occurs during "hot-fill" of the container. When a beverage or product at an elevated temperature is dispensed into the container, the beverage temperature imposes additional mechanical stresses on the container's structure. Immediately upon being dispensed into the container, the "hot" temperature of the beverage decreases the rigidity of the container and the container again becomes susceptible to the effects of the unrelaxed retractive stresses.

Beyond the production process the container must continue to maintain its ability to withstand deformation. For example, as a hot-filled liquid cools, its volume reduces and a resultant negative pressure is produced. In contrast, sudden increases in internal pressure can occur when the container is handled or dropped. In both instances the container must be capable of resisting deformation.

It is known that within a cross-section of the base of a PET container, the molecular orientation of the PET will not be uniform. Rather, the bottom wall will consist of several regions of varying molecular orientation. One region, an amorphous region, is located at the center of the base. Here, the PET remains significantly thick and is not stretched or oriented by the blowing process. The bottom wall of the container will also consist of a uniformly oriented region located adjacent to the peripheral edge of the base. In this region the PET is stretched, blown and biaxially oriented. Both of the above mentioned regions are resistant to the unrelaxed retractive stresses. The center amorphous region is resistant due to its increased thickness and the uniformly oriented region because of its uniform biaxial orientation. However, between the amorphous and uniform regions there exists an inevitable artifact of the blow molding process, a transition region. The transition is neither significantly thick nor uniformly oriented, and therefore, not resistant to the unrelaxed retractive stresses.

U.S. Pat. No. 4,598,831, issued to Nakamura, discloses a method of reshaping and orienting a portion of the transition region in the base so as to form a radial array of outwardly directed triangular pyramid sections, with the bottom surface of the pyramid sections being sufficiently stretched and oriented. However, between the pyramid sections, and along the sidewalls of the pyramids themselves, there exists a significant amount of transition region which remains unoriented, and therefore, non-resistant to the retractive stresses.

The U.S. patent application entitled "SPIRAL CONTAINER BASE STRUCTURE FOR HOT FILL PET CONTAINER", Ser. No. 452,638, filed Dec. 19, 1989 and assigned to the assignee of the present invention, discloses a PET container having a spiral base structure and is herein incorporated by reference.

In accordance with the present invention, a PET container is provided having a base structure of a configuration which maintains both structural rigidity and resistance to random deformation and shrinkage in response to the previously mentioned mechanical and thermal stresses. This is accomplished by providing selective sectional reinforcement where the greatest concentration of unrelaxed retractive stresses exist, namely, in the transition region. More particularly, a number of specific sized involute embossments are positioned in that limited transition region of the base structure's dome. The embossments are both effective and efficient, in that, they are provided only where required and their specific geometry is tuned to the stresses particularly encountered in the thermal stabilization process.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 2 is a sectional view through a blow mold showing a container provided with the base structure of the present invention and also showing the axial stretching of the preform in phantom;

FIG. 3 is a bottom view of a container incorporating the base structure of the present invention;

FIG. 4 is a enlarged sectional view of a portion of the base structure of the present invention taken substantially along line 4—4 in FIG. 3; and FIG. 5 is a perspective view of a portion of the base structure of the present invention illustrating one involute embossment.

DETAILED DESCRIPTION OF THE INVENTION

Figure 1:
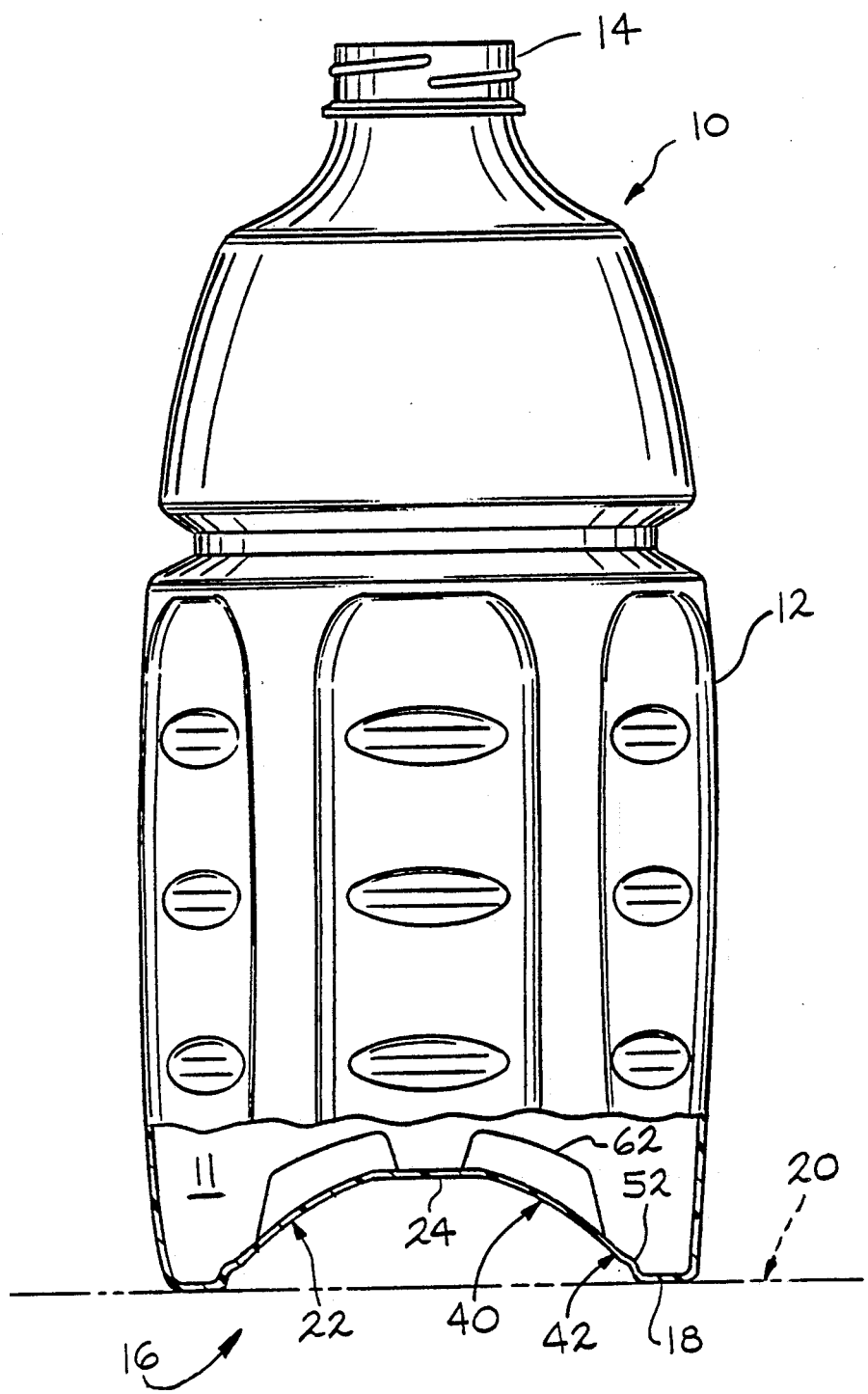
FIG. 1 is a side elevational view of a container incorporating the base structure of the present invention and showing the bottom portion of the container broken away in curved section.

With reference to the drawing, FIG. 1 illustrates a container having a base structure constructed according to the principles of the present invention and is generally designated as 10. The container 10 generally includes a sidewall 12, an upper closure mouth 14, and a base 16. The sidewall 12 can be formed into a multitude of configurations so as to provide the desired structural characteristics, aesthetic qualities, and product identification.

The mouth 14 is a rigid ring adapted to receive and withstand the mechanical loads imposed by a threaded closure cap (not shown). The base 16 includes a peripheral ring 18, defining a support plane 20, and a generally concave dome 22. The dome 22 extends upwardly into the body cavity 11 of the container 10 until terminating in a centrally located disk 24. The dome 22 may be a spherical, parabolic, conical, tapered or other similarly contoured surface. The configuration of the base 16 which specifically incorporates the features of the present invention will be described in greater detail below.

During fabrication of the container 10, a preform 26 is first positioned inside of a blow mold 28. The blow mold 28 is comprised of a right mold half 30, a left mold half 32 and a mold bottom 34, all of which incorporate relief surfaces. After being positioned within the mold 28, the preform 26 is heated and a plunger 36 is extended to axially elongate the preform 26. Once axially stretched, the preform 26 is expanded by the application of differential pressure provided through a pressure port 38 in the plunger 36. The preform 26 is expanded until the PET conforms to the inner surfaces of the mold 28. Expansion could also be conducted simultaneously with the axial stretching. During stretching and expansion, the container 10 undergoes a combination of both axial and radial elongation. As previously mentioned, insufficient elongation and expansion of the PET will give rise to unrelaxed retractive stresses in the final product.

To enable control of the mold 28 temperature, the mold halves 30 and 32 are provided with coolant passages 44. By varying temperatures within the mold 28 itself, differing material characteristics may be imparted to designated areas of the container 10. The use of this type of mold is described in U.S. Pat. Nos. 4,497,855 and 4,318,882, which are commonly assigned to the assignee of the present application and hereby incorporated by reference. The above mentioned patents describe a container which is molded into a first configuration and subsequently remolded into a second configuration of increased volume. Such molding allows the container to return to its first configuration, in response to the PET's "memory", as the hot-fill liquid contracts during cooling. A container 10 having a base structure in accordance with the present invention may be constructed using the technology disclosed in the above patents.

During elongation of the preform 26, the central disk 24 of the base 16 remains both amorphous and sufficiently thick, thereby avoiding the development of unrelaxed retractive stresses. In the outermost portion of the dome 22 is a region 42 which becomes sufficiently stretched and expanded during the blowing process to uniformly orient the PET. This uniform region 42 also avoids the development of unrelaxed retractive stresses. However, between the amorphous central disk 24 and the uniformly oriented region 42 there exists a transition region 40. During blow molding, the transition region 40 begins to undergo elongation but fails to become sufficiently stretched and oriented. Without the thickness of the central disk 24 or the orientation of the uniform region 42, the transition region 40 is particularly susceptible to the random and asymmetrical buckling capable of inducement by the unrelaxed retractive stresses. No distinct separation exists between these three regions. However, as distance increases from the central disk 24, the PET material of the transition region 40 becomes increasingly oriented until merging with the uniformly oriented region 42.

The base portion 16 of the present invention is best described with reference to FIGS. 3, 4 and 5. As previously mentioned, the center of the concave dome 22 is defined by the thick and amorphous central disk 24. A number of involute embossments 46 originate equidistantly about the central disk 24 and radiate outward and downward along the dome 22 in three dimensional curves.

The embodiment illustrated in FIG. 3 displays six embossments 46 arranged in an overlapping fashion. The overlap is best seen along a radial line 60 drawn from the center of the central disk 24. In particular, a tail 48 of one embossment 46 overlaps a head 50 of an adjacent embossment 46 along radial line 60. A greater or lesser number of embossments 46 may be employed so long as the transition region is substantially filled with an array of embossments 46 and the involute curve of the embossments 46 is tailored so as to permit the overlapping of adjacent heads 50 and tails 48.

Each embossment 46 arcs about the central disk 24 along an involute curve, generally downward along the dome 22, until terminating where the transition region 40 merges with the uniformly oriented region 42. The dome 22 continues downward from the lowermost portion of the embossments 46 through the uniformly oriented region 42 until being connected through an annular rim 52 to the peripheral ring 18.

Certain features enable the present base structure 16 to accomplish the necessary stabilization of the transition region 40. First, the embossments 46 are limited with respect to their positioning on the dome 22. More specifically, all of the embossments 46 are positioned only within the transition region 40 itself. In this manner, the embossments 46 cover only a percentage, approximately thirty-five percent, of the dome's 22 total surface area. This is best seen in the planar projection of the base 16 in FIG. 3.

Additionally, the upper surface 62 of each embossment 46 is tapered so as to rise toward the center of the dome 22. In order to ensure proper stabilization, adequate orientation and a sufficient amount of PET to fully form and develop the base 16, the upper surface 62 is preferred to rise at a taper within a range of sixty (60°) to ninety degrees (90°) out from vertical.

As seen in FIG. 4, each involute embossment 46 has a cross-sectional shape generally corresponding to a "staple" configuration 54. The staple configuration 54 is positioned so that the closed end portion 56 is raised upwardly into the body cavity 11 of the container 10. The embossment sidewalls 57 are angled inward so that the embossment 46 decreases in width as it increases in height. In this manner, an "upper portion" of the embossment 46 is not undercut by a "lower portion". Such an undercut would substantially weaken the overall stabilization characteristics of the embossments 46, possibly resulting in the collapse of embossment 46 under pressure. Alternatively, the closed end 56 of the embossment 46 could also be one of various other continuous bends.

Between each adjacent embossment 46 of the present invention there extends an involute valley portion 58 corresponding to the surface of the dome 22. Like the embossments 46, each valley 58 originates equidistantly about the central disk 24 and radiates outward and downward along the dome 22 in a three dimensional curve. The valleys 58 become an indistinguishable feature of the dome 22 at the termination of the embossments 46. If desired, the surface of the valleys 58 may be "roughened" for additional stiffening of the base 16.

A second embodiment of the present invention entails a gap arrangement of the involute embossments 46. In this embodiment, the tail 48 of one embossment 46 would exhibit a radial gap and not overlap the head 50 of the adjacent embossment 46 as described previously.

A third embodiment of the present invention is a matched arrangement of embossments 46. In this embodiment, a second row of involute embossments 46 is positioned on the dome 22 in an analogous orientation below the first row of embossments 46, but still within the transition region 40. Both rows of embossments 46 could further incorporate either the overlap or gap embodiment.

A variation on the third embodiment is the "minefield" embodiment. Here, the second row of embossments 46 are positioned in an offsetting arrangement, below and generally between the first row. Again, both rows of embossments 46 may be of either the overlap or gap embodiment.

In all of the embodiments, the embossments 46 are confined to the area of the base 16 where stabilization is needed most, namely, the transition region 40. Previously, the industry employed an overkill or "shotgun" approach to stabilization. In other words, the stabilization structures extended across the entire dome 22 through the uniformly oriented region 42.

By way of example, the following "hot-fill" container incorporates the teachings of the present invention. In a hot-fill container of the standard sixty-four ounce size, the base structure 16 has a diameter of approximately 3.8 inches. Each embossment 46 is positioned equidistantly about the central disk 24 and within the transition region 40 of the dome 22. Possible embossment 46 heights, measured from a tangent to the dome 22 surface, range from 0.156 inches to 0.45 inches, with a preferred height of 0.3 inches. The stated height range insures sufficient development, stabilization and orientation of the PET in the base 16. In all of the embodiments, the width of the valleys 58 does not exceed the height of the embossments 46. Thus, the preferred width of the valleys 58 in the above example would be 0.3 inches or less. In order to afford sufficient development, stabilization and orientation of the base 16, the rise of the upper embossment surfaces 62 is between sixty and ninety degrees, when measured out from vertical, with a preferred rise of approximately sixty-eight degrees (68°).

Presently, the lower hemispherical region of the preform 26 is stretched axially and radially from its center downward along the mold bottom to form the dome. When molded in this fashion, the amount of stretch capable of being induced to orient to the PET is limited by the radial distance of the dome surface. In the present invention, as the heated preform 26 is blown into conformity with the base configuration of the mold bottom 34, the PET is forced to stretch along the involute curves of the embossments 46 and interlying valleys 58. Being curved, the embossments 46 increase the distance over which the PET may be induced to stretch. Thus, the present base structure enables a greater amount of sufficiently stretched and oriented PET to be produced in the base 16 of the container 10. When the container 10 is subsequently subjected to the elevated temperatures of demolding and hot-filling, the unrelaxed retractive stresses, already restricted in their development, are further counteracted by the structure rigidity of the involute embossments 46.

The involute embossments 46 and their confinement to the transition region 40 of the base 16 provide a number of substantial benefits over the present blow molding technology. First, by inducing a greater amount of stretch, the involute embossments 46 increase the overall amount of PET that becomes uniformly oriented 42 during blow molding of the container 10. Thus, the area of the dome 22 that remains susceptible to the influences of the unrelaxed retractive stresses and elevated temperatures is significantly reduced. Furthermore, undeformed radial load bearing members are no longer required. The load bearing characteristics needed to resist internal pressure changes are provided by the inherent rigidity of the embossments 46 themselves. The overall result is that insufficiently oriented PET is effectively and efficiently reduced without any sacrifice in structural integrity.

While the above invention constitutes the preferred embodiments of the present invention, it will be appreciated that the invention is susceptible to modification, variation and change without departing from the proper scope and fair meaning of the accompanying claims.

I claim:

1. A PET container formed by blow molding and adapted to be filled with liquid at a temperature elevated above room temperature, said container comprising an upper portion defining a sealable closure, a sidewall portion, and a base structure closing the bottom of the container and formed integral with said sidewall portion, said base structure including a peripheral support ring, a dome, and a central disk, said support ring being formed with the lower end of said sidewall portion and being substantially concentric with said sidewall portion, said dome being formed integral with said support ring and extending upwardly into said container until terminating in said central disk, said disk also being substantially concentric with said sidewall portion, said dome including an annular wall extending between said disk and said support ring, a transition portion of said annular wall having present therein unrelaxed retractive stresses resulting from blow molding, said transition portion being subject to deformation by virtue of said unrelaxed retractive stresses and the heating effect of filling said container with liquid at an elevated temperature, said transition portion further being shaped to resist said stresses by the provision of a plurality of spaced involute embossments extending thereacross, each said embossment extending interiorly of said container and having substantially upright reinforcing walls with connecting portions therebetween, said embossments also extending in a direction radiating substantially outwardly and downwardly along said dome in three dimensional involute paths of substantially spiral shape from said disk to thereby reinforce the ability of said transition region to resist said deformation.

2. The container according to claim 1 wherein said annular wall includes an upright reinforcing rim integrally joining said annular wall to said support ring.

3. A container according to claim 1 wherein said embossments are equidistantly positioned about said disk on said annular wall.

4. A container according to claim 1 wherein said embossments resist said stresses in the dome by reducing the area of said dome in which said unrelaxed retractive stresses can form.

* * * * *